US011999462B2

(12) United States Patent
Hefner et al.

(10) Patent No.: US 11,999,462 B2
(45) Date of Patent: Jun. 4, 2024

(54) DETECT AND AVOID SENSOR INTEGRATION

(71) Applicant: Bell Textron Inc., Fort Worth, TX (US)

(72) Inventors: Levi Hefner, Dallas, TX (US); Maurice Griffin, Boerne, TX (US); Jennifer Diana Andrews, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 454 days.

(21) Appl. No.: 17/116,778

(22) Filed: Dec. 9, 2020

(65) Prior Publication Data

US 2022/0177109 A1 Jun. 9, 2022

(51) Int. Cl.
| | |
|---|---|
| *B64C 1/06* | (2006.01) |
| *B64C 1/36* | (2006.01) |
| *B64C 29/02* | (2006.01) |
| *B64C 39/08* | (2006.01) |
| *B64D 9/00* | (2006.01) |
| *B64D 47/08* | (2006.01) |

(52) U.S. Cl.
CPC ............... *B64C 1/068* (2013.01); *B64C 1/36* (2013.01); *B64C 29/02* (2013.01); *B64C 39/08* (2013.01); *B64D 9/00* (2013.01); *B64D 47/08* (2013.01)

(58) Field of Classification Search
CPC ......... B64C 29/02; B64C 1/0683; B64C 1/36; B64D 13/006; B64U 20/80
See application file for complete search history.

(56) References Cited

U.S. PATENT DOCUMENTS

| | | | |
|---|---|---|---|
| 9,505,484 B1 | 11/2016 | Al-Sabah | |
| 9,608,320 B2* | 3/2017 | Fournie | H01Q 1/281 |
| 10,232,950 B2 | 3/2019 | McCullough et al. | |
| 10,551,266 B2* | 2/2020 | Bernus | G01P 5/02 |
| 10,605,165 B2* | 3/2020 | Abe | B64C 11/02 |
| 10,814,981 B2* | 10/2020 | Macie | B64D 33/02 |
| 10,870,487 B2* | 12/2020 | McCullough | B64C 29/02 |
| 2018/0002023 A1* | 1/2018 | Tian | F01P 5/02 |
| 2018/0170553 A1* | 6/2018 | Wang | F28D 15/04 |
| 2018/0273158 A1 | 9/2018 | Courtin | |
| 2018/0297711 A1 | 10/2018 | Oldroyd et al. | |
| 2019/0031334 A1 | 1/2019 | McCullough et al. | |

(Continued)

*Primary Examiner* — Joshua J Michener
*Assistant Examiner* — Michael B. Kreiner
(74) *Attorney, Agent, or Firm* — Bradley Arant Boult Cummings LLP (57) ABSTRACT

In an embodiment, an aircraft includes first and second wings. The aircraft also includes a plurality of propulsion assemblies, the plurality of propulsion assemblies including a propulsion assembly connected to each end of each of the first and second wings. The aircraft also includes first and second vertical supports disposed between the first and second wings. The aircraft also includes a storage pod disposed between the first and second vertical supports. The storage pod includes a nose portion that extends forward of the plurality of propulsion assemblies. The nose portion includes at least one radar and at least one camera. Other embodiments of this aspect include corresponding computer systems, apparatus, and computer programs recorded on one or more computer storage devices, each configured to perform the actions of the methods.

9 Claims, 12 Drawing Sheets

(56) References Cited

U.S. PATENT DOCUMENTS

| | | | |
|---|---|---|---|
| 2019/0106192 A1* | 4/2019 | Woodworth | B64C 1/069 |
| 2019/0291862 A1 | 9/2019 | Lyasoff et al. | |
| 2019/0373173 A1 | 12/2019 | Wang et al. | |
| 2020/0010200 A1* | 1/2020 | Chen | H05K 7/20 |
| 2020/0148345 A1 | 5/2020 | Wittmaak, Jr. et al. | |
| 2020/0172236 A1 | 6/2020 | George | |
| 2021/0245875 A1* | 8/2021 | Bianco Mengotti | B64C 27/54 |
| 2021/0300550 A1* | 9/2021 | Owen | B64C 39/024 |
| 2022/0081111 A1* | 3/2022 | Pei | B64C 11/001 |
| 2022/0169380 A1* | 6/2022 | Mehrgan | B64C 39/08 |

* cited by examiner

DETECT AND AVOID SENSOR INTEGRATION

RESEARCH OR DEVELOPMENT

The invention set forth herein was made in the performance of work under NASA contract 80AFRC19M0004 and is subject to the provisions of section 20135 of the National Aeronautics and Space Act (51 USC 20135).

BACKGROUND

Technical Field

The present disclosure relates generally to aircraft control and more particularly, but not by way of limitation, to detect and avoid sensor integration.

History of Related Art

Unlike fixed-wing aircraft, vertical takeoff and landing ("VTOL") aircraft do not require runways. Instead, VTOL aircraft are capable of taking off vertically, hovering, and landing vertically. One example of VTOL aircraft is a helicopter, which is a rotorcraft having one or more rotors that provide vertical lift and directional thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tailsitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes an aircraft. The aircraft includes first and second wings. The aircraft also includes a plurality of propulsion assemblies, the plurality of propulsion assemblies including a propulsion assembly connected to each end of each of the first and second wings. The aircraft also includes first and second vertical supports disposed between the first and second wings. The aircraft also includes a storage pod disposed between the first and second vertical supports. The storage pod includes a nose portion that extends forward of the plurality of propulsion assemblies. The nose portion includes at least one radar and at least one camera. Other embodiments of this aspect include corresponding computer systems, apparatus, and computer programs recorded on one or more computer storage devices, each configured to perform the actions of the methods.

In an embodiment, another general aspect includes a storage pod for an aircraft. The storage pod includes a nose portion that includes at least one camera and at least one radar. The storage pod also includes a rear portion. The storage pod also includes a storage compartment defined by a cavity between the nose portion and the rear portion. Other embodiments of this aspect include corresponding computer systems, apparatus, and computer programs recorded on one or more computer storage devices, each configured to perform the actions of the methods.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of-an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that is farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

As autonomous unmanned aerial vehicles (or "UAVs") proliferate, it is becoming increasingly important for aircraft to sense the presence of other aircraft. It is also advantageous to do so in a way that is not dependent upon global positioning system (GPS) coordinates, as there are some situations in which GPS coordinates of other aircraft may not be available (e.g., in areas where GPS coordinates of other aircraft are not required to be broadcast). To this end, various sensors, such as radars and cameras, are sometimes employed in UAVs for detect and avoid ("DAA") applications. In general, these sensors require particular installation locations and must be calibrated relative to one another. Once calibrated, it is usually preferred that sensors not be removed.

Disclosed herein are embodiments of a vertical takeoff and landing ("VTOL") aircraft that includes a storage pod. In some embodiments, the storage pod is removable from the aircraft. In various embodiments, the removal pod is configured to enclose equipment, such as computers and communications equipment, as well as receive payloads of various shapes, sizes, and weights. The present disclosure describes examples of integrating DAA sensors, such as radars and cameras, into the removal pod. In certain embodiments, the DAA sensors can be placed on the removal pod in such a way that desired fields of view or regard can be satisfied without interference with structural components of the VTOL aircraft (e.g., interference resulting from portions of aircraft structure being observed within a field of regard or view). Further, in various embodiments, the DAA sensors can advantageously employ modularity so as to improve reuse applications and minimize recalibration scenarios.

Figure 1:
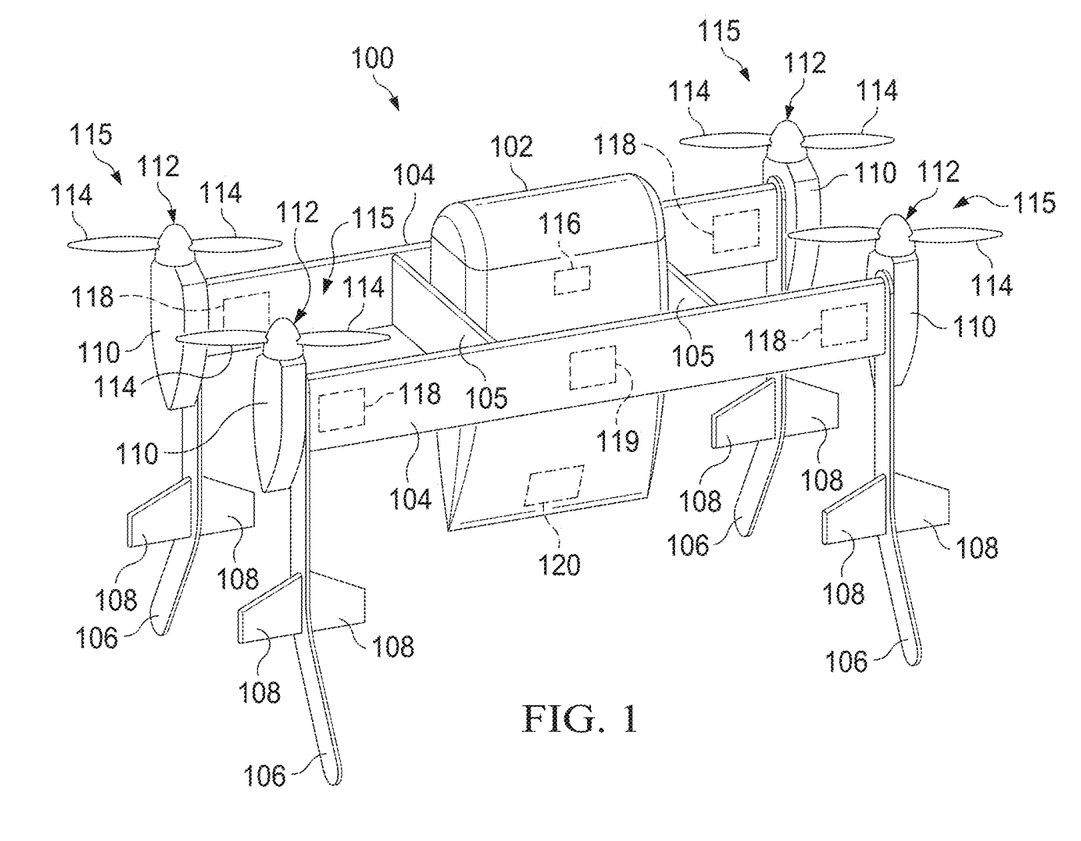
FIG. 1 illustrates an aircraft configured for operation in a helicopter flight mode in accordance with embodiments described herein.
Figure 2:
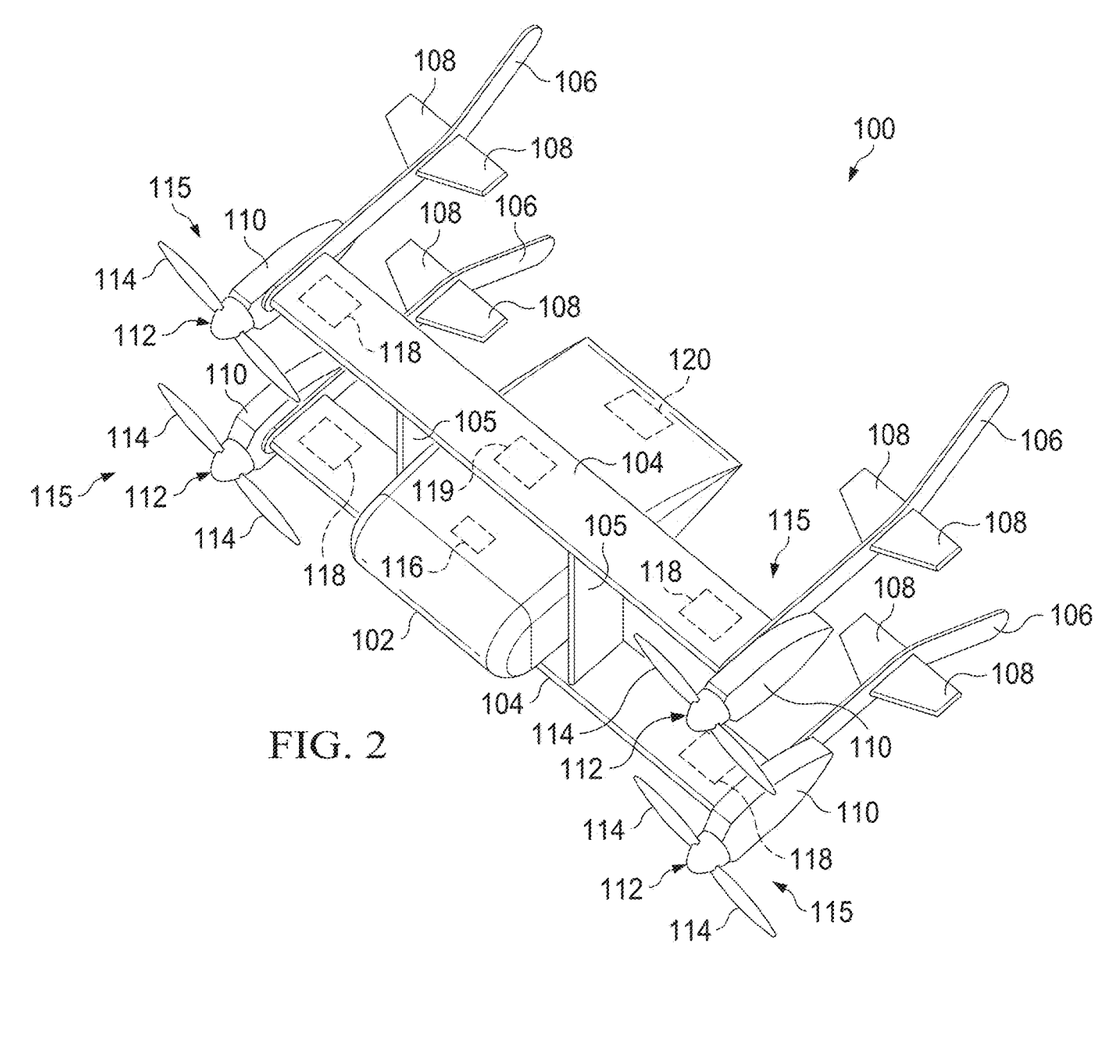
FIG. 2 illustrates an aircraft configured for operation in an airplane flight mode in accordance with embodiments described herein.

Referring now to FIGS. 1 and 2, oblique views of an aircraft 100 are shown according to this disclosure. Aircraft 100 is generally configured as a VTOL aircraft, more specifically an autonomous pod transport ("APT") convertible drone aircraft, that is operable in a helicopter mode (shown in FIG. 1) associated with vertical takeoff from and landing to a landing zone, hover, and sideward and rearward mobility or flight, and an airplane mode (shown in FIG. 2) associated with forward, wing-borne flight. Additionally, since aircraft 100 is a convertible aircraft, it is also operable in a conversion mode when transitioning between the helicopter and airplane modes. Further, being a drone-type aircraft, aircraft 100 is configured for remote control and operation. Additionally, at least in some embodiments, aircraft 100 may be fully made autonomous and self-directed via a predetermined or preprogrammed location-based guidance system (e.g., global positioning system ("GPS"), coordinate-based location, street address, etc.).

Aircraft 100 comprises a storage pod 102 that may function as the aircraft fuselage, biplane wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 also comprises a payload sensor 116, a plurality of aircraft sensors 118, an orientation sensor 119, and a control system 120. Wings 104 comprise a substantially parallel, double-wing configuration that provides lift to the aircraft 100 during forward flight while also maintaining a smaller footprint of the aircraft 100 when the aircraft 100 is on the ground. Vertical supports 105 are disposed on each side of the storage pod 102 and affixed between the wings 104 to provide structure and support to the wings 104. The storage pod 102 is generally positioned between the wings 104 and the vertical supports 105. In the embodiment shown, the storage pod 102 is affixed to the vertical supports 105. However, in other embodiments, the storage pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 provide a wider base for the landing gear. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor. However, in other embodiments, the rotor systems 112 may be driven by a combustion engines or auxiliary power unit through a plurality of interconnect driveshafts and/or auxiliary gearboxes. Furthermore, since aircraft 100 functions as a convertible aircraft, the rotational speeds of each rotor system 112 may be selectively controlled to orient aircraft 100 in the various flight modes. In an example embodiment, the storage pod 102 of aircraft 100 may enclose various computers or equipment, including the control system 120 and communications equipment. The storage pod 102 may also include space for receiving cargo such as payloads of varying shapes, sizes, and weights. In some embodiments, the received cargo can include additional sensors or sensor packages, for example, for DAA applications. In some embodiments, the storage pod 102 is removable from the aircraft 100.

Figure 3:
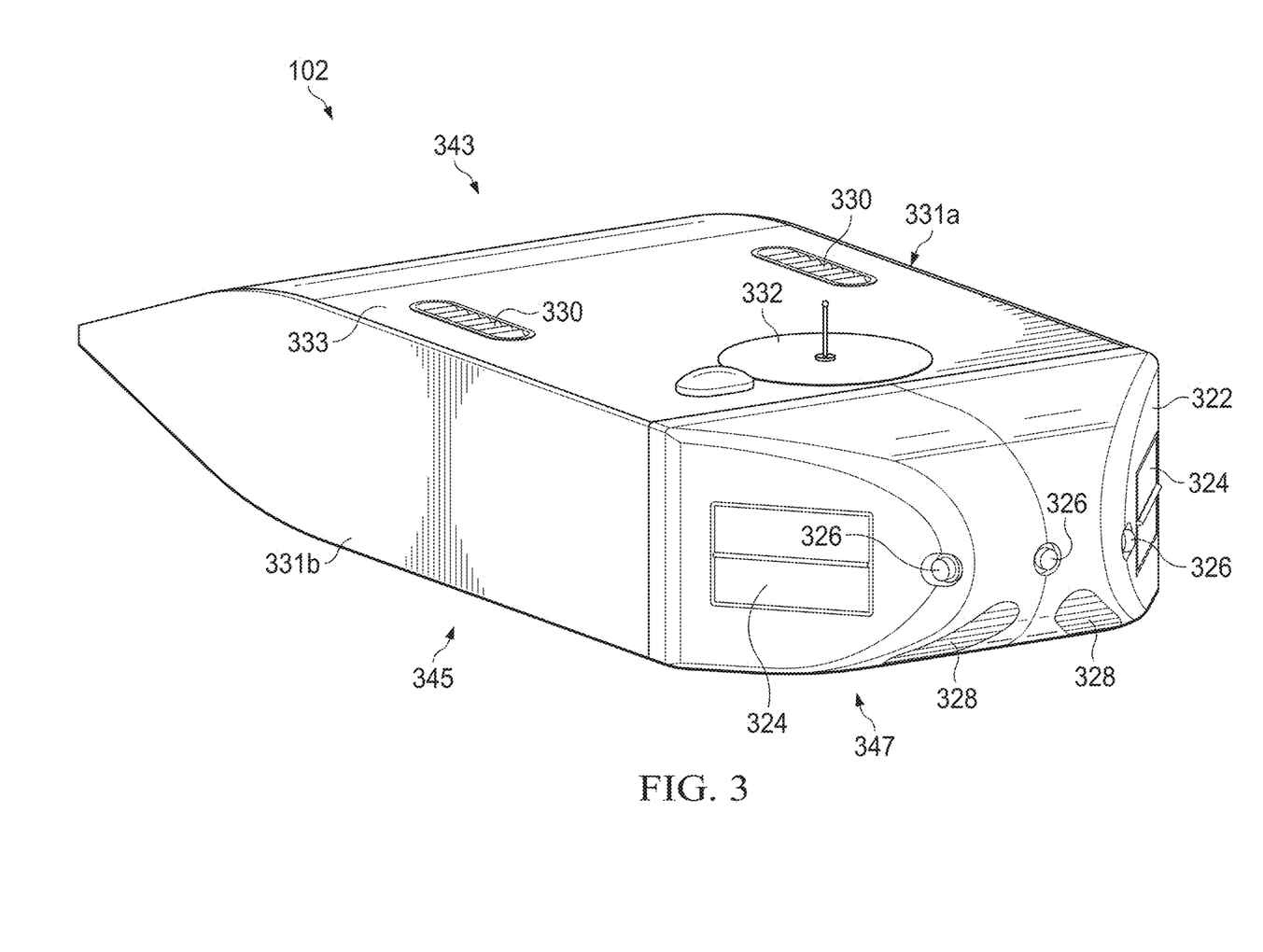
FIG. 3 illustrates a front-right perspective view of a storage pod.

FIG. 3 illustrates a front-right perspective view of the storage pod 102. The storage pod 102 includes an aerodynamic rear portion 343, a main body 345, and a nose portion 347. An exterior of the storage pod 102 is shown to include a conical front cover 322, a left-side cover 331a, a right-side cover 331b, and a top cover 333. The left-side cover 331a, although not explicitly shown in the view of FIG. 3, is symmetric to the right-side cover 331b and is located on a left side of the storage pod 102 opposite the right-side cover 331b.

With reference to the nose portion 347, the conical front cover 322 is positioned over radars 324 and cameras 326 and configured to give the radars 324 and the cameras 326 access to the exterior via openings therein. In some cases, as illustrated, the radars 324 and/or the cameras 326 can protrude through such openings and extend outward of the conical front cover 322. The cameras 326 may be, for example, optical cameras, with both the radars 324 and the cameras 326 being configured for DAA applications. The conical front cover 322 is shown to include air inlets 328 for purposes of allowing air to enter the storage pod 102, for example, during forward flight. For illustrative purposes, the radars 324, the cameras 326, and the air inlets 328 are shown in quantities of two, three, and two, respectively. One skilled in the art will appreciate, however, that the quantities of the aforementioned components can be varied to suit the objectives of a given implementation.

Top cover 333 has an antenna 332 disposed thereon, for example, for use with an Automatic Dependent Surveillance-Broadcast (ADS-B) receiver that may be disposed within the storage pod 102. Top cover 333 is shown to include air outlets 330 in a quantity of two for illustrative purposes. As will be described in greater detail relative to FIG. 5, the air inlets 328 and the air outlets 330 can facilitate passive cooling of an interior of the storage pod 102 during forward flight.

Figure 4:
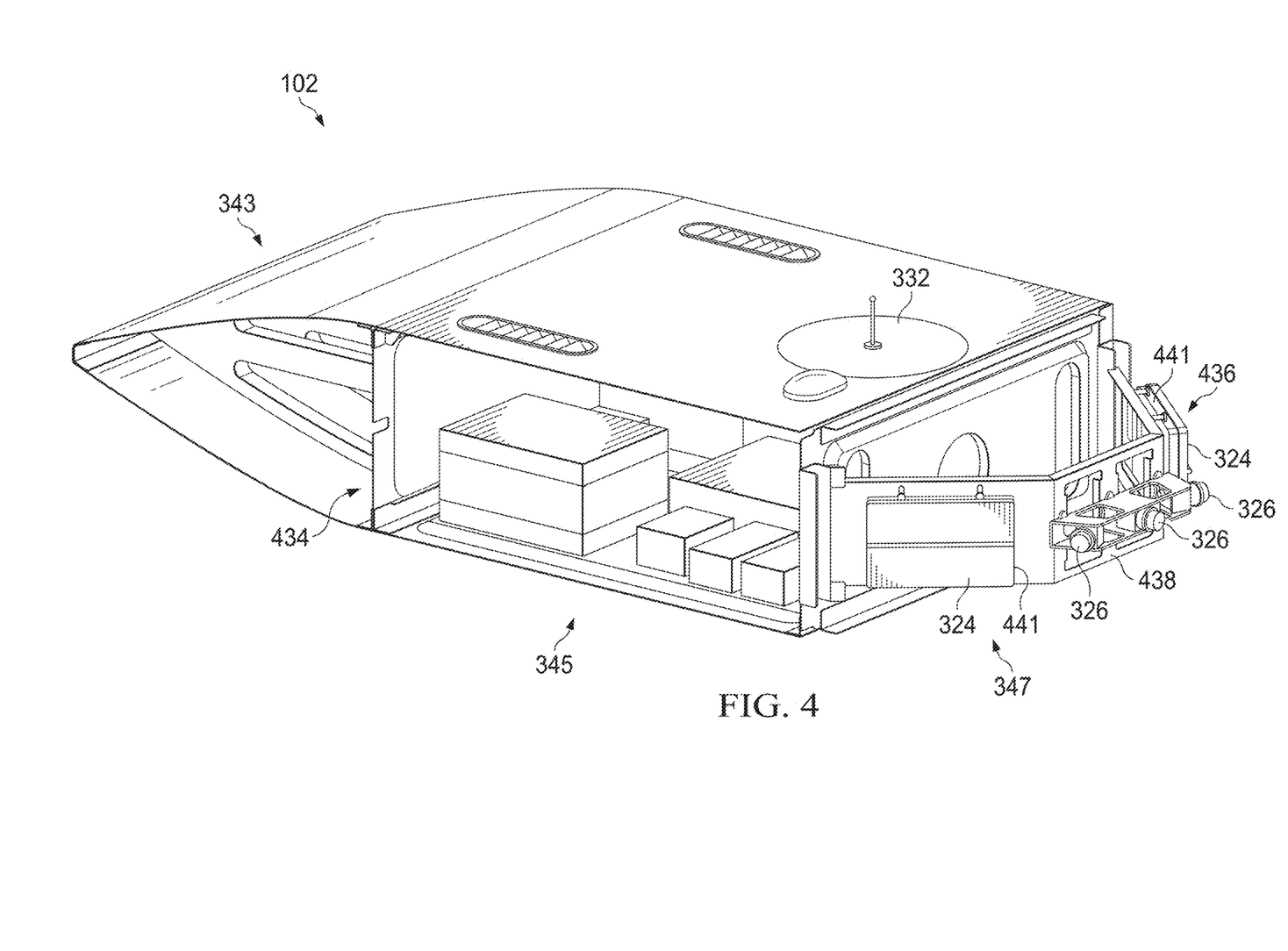
FIG. 4 illustrates a front-right perspective view of a storage pod with a front cover and a right-side cover removed.

FIG. 4 illustrates a front-right perspective view of the storage pod 102 with both the conical front cover 322 and the right-side cover 331b removed. The removal of the right-side cover 331b exposes a storage compartment 434 in the main body 345. The storage compartment 434 is defined by a space or cavity between the rear portion 343 and the nose portion 347. The storage compartment 434 can include, for example, cargo such as various payloads, equipment such as the control system 120 and an ADS-B receiver, combinations of the foregoing and/or the like. Equipment in the storage compartment 434, such as the control system 120, can be communicably coupled to the radars 324 and to the cameras 326, for example, for executing DAA functions. The ADS-B receiver can be communicably coupled to the control system 120 and to the antenna 332.

The removal of the conical front cover 322 exposes a removable sensor assembly 436 in the nose portion 347. In the illustrated embodiment, the removable sensor assembly 436 is conical in shape in similar fashion to the conical front cover 322. The removable sensor assembly 436 includes radar assemblies 441 that each include one of the radars 324. In the illustrated embodiment, the removable sensor assembly 436 also includes the removable camera assembly 440 that includes the cameras 326. In certain embodiments, the removable camera assembly 440 and the radar assemblies 441 are each removably coupled to a sensor frame 438. The sensor frame 438, in turn, is removably attached to the main body 345 of the storage pod 102. In some embodiments, the above-described equipment which may be located in the storage compartment 434, such as the control system 120 and the ADS-B receiver, can instead be located in the nose portion 347. In these embodiments, additional space is thereby made available for receiving cargo in the storage compartment 434.

Figure 5:
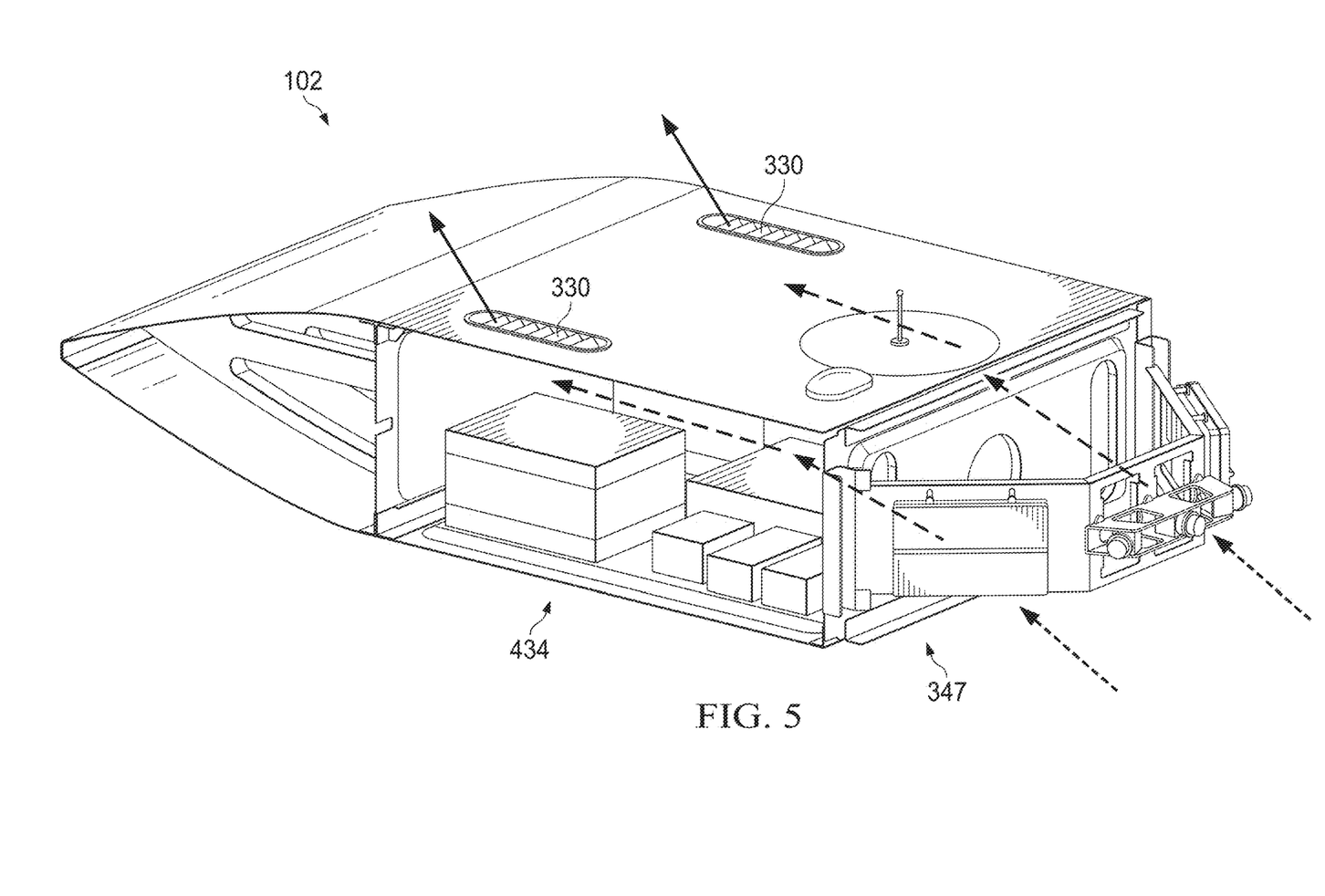
FIG. 5 illustrates an example of passive cooling of a storage compartment.

FIG. 5 illustrates another front-right perspective view of the storage pod 102 with both the conical front cover 322 and the right-side cover 331b removed. More particularly, FIG. 5 illustrates an example of passive cooling of the storage compartment 434. In certain embodiments, during forward flight of the aircraft 100, air enters the nose portion 347 through the air inlets 328, passes through the storage compartment 434, and exits the storage compartment 434 through the air outlets 330. In various embodiments, the continual passage of air through the storage pod 102 in this fashion facilitates passive cooling of the storage compartment 434 and equipment therein, thereby improving component performance.

Figure 6A:
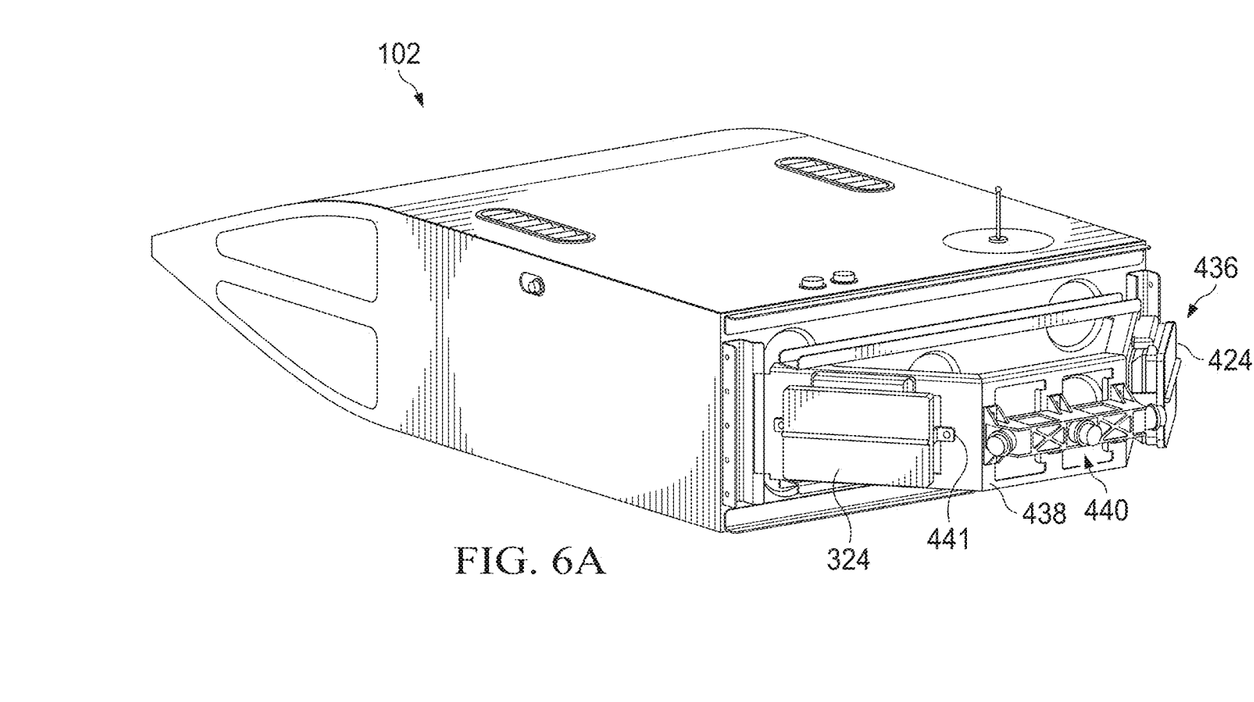
FIGS. 6A-C illustrate modular characteristics of a removable sensor assembly.
Figure 6B:
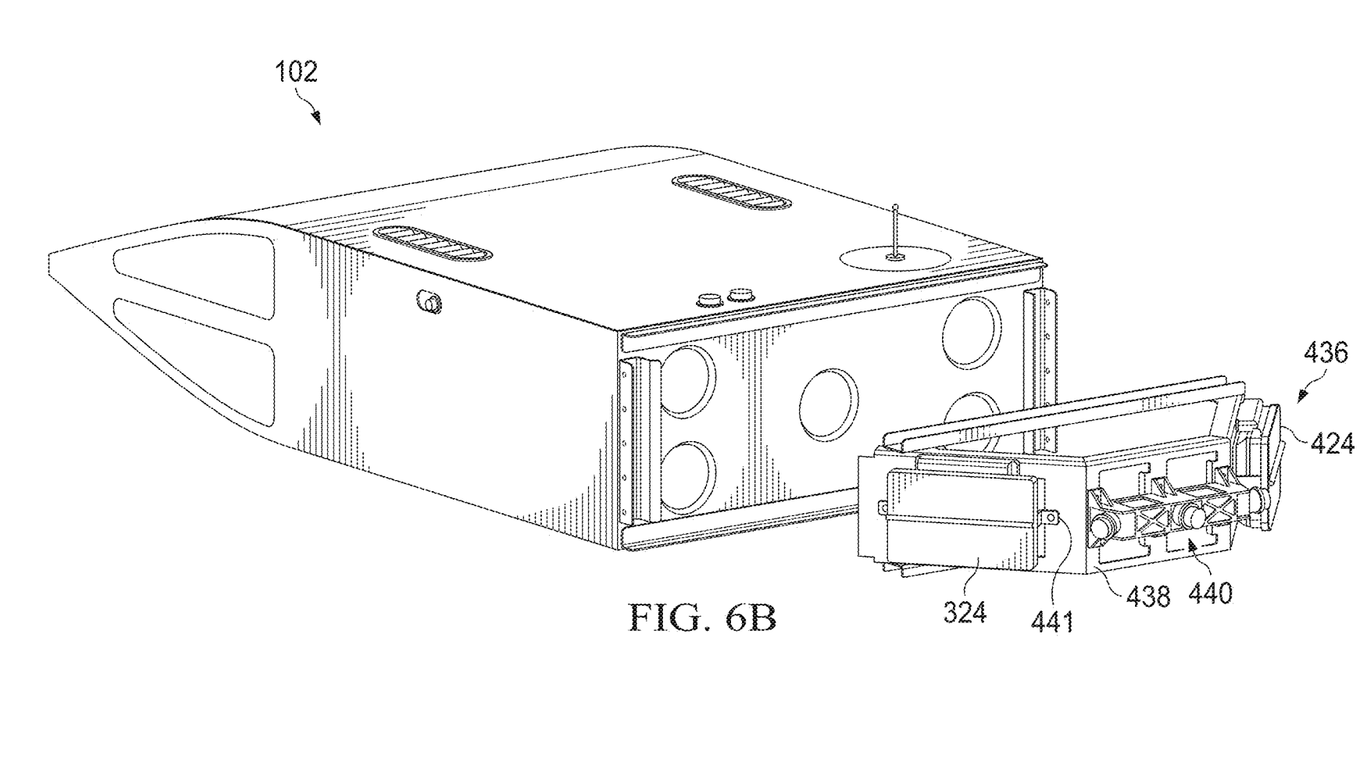
Figure 6C:
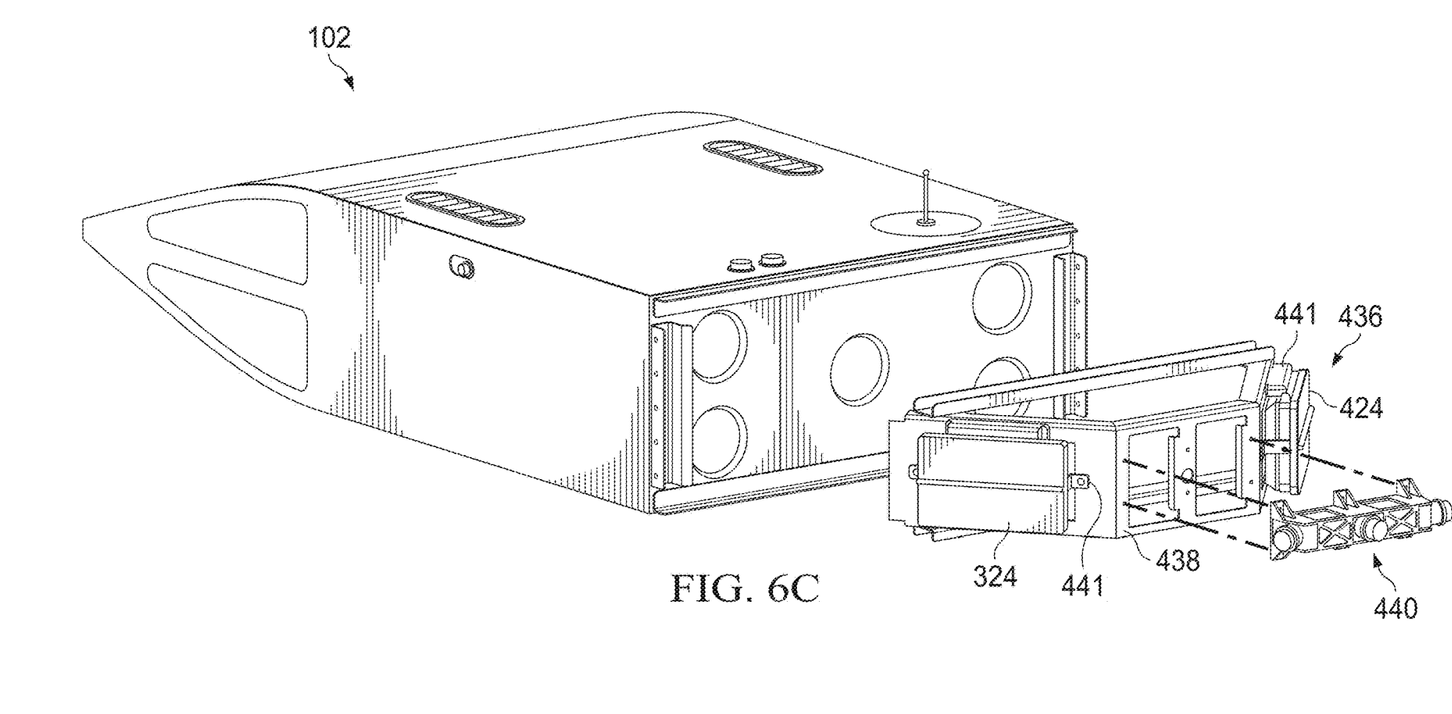

FIGS. 6A-C illustrate modular characteristics of the removable sensor assembly 436 and components thereof. FIG. 6A illustrates the removable sensor assembly 436 in an attached configuration. As shown in FIG. 6B, the removable sensor assembly 436 is detachable from the storage pod 102, for example, to facilitate replacement of the removable sensor assembly 436 or reuse of the removable sensor assembly 436 with another pod similar to the storage pod 102. As shown in FIG. 6C, the removable camera assembly 440 is detachable from the sensor frame 438, for example, to facilitate separate replacement of the removable camera assembly 440 or reuse of the removable camera assembly 440 with another sensor assembly similar to the removable sensor assembly 436. The radar assemblies 441 are similarly detachable from the sensor frame 438, for example, to facilitate separate replacement of the radar assemblies 441 or reuse of the radar assemblies 441 with another sensor assembly similar to the removable sensor assembly 436.

Advantageously, in certain embodiments the above-described modular characteristics of the removable sensor assembly 436 enables reuse and relocation of sensors without recalibration. In certain embodiments, the radars 324 and the cameras 326 are initially calibrated relative to each other to include, for example, location and orientation. In certain embodiments, the removable camera assembly 440, the radar assembly 441 and the removable sensor assembly 436 as a whole can serve to maintain the initial calibration and thereby facilitate reuse. For example, if the removable camera assembly 440 were to be relocated to a different sensor assembly similar to the removable sensor assembly 436, the position and orientation of the cameras 326 relative to each other can be preserved via the removable camera assembly 440 and thus eliminate a need for recalibration. Similarly, if the removable sensor assembly 436 in its entirety were to be relocated to a different pod similar to the storage pod 102, the position and orientation of the radars 324 and the cameras 326 relative to each other can be preserved via the removable sensor assembly 436 as a whole. In this manner, a need for recalibration of the radars 324 and/or the cameras 326 upon removal and relocation of the removable sensor assembly 436 can be eliminated. Other example advantages of the modularity described herein will be apparent to one skilled in the art after a detailed review of the present disclosure.

Figure 7A:
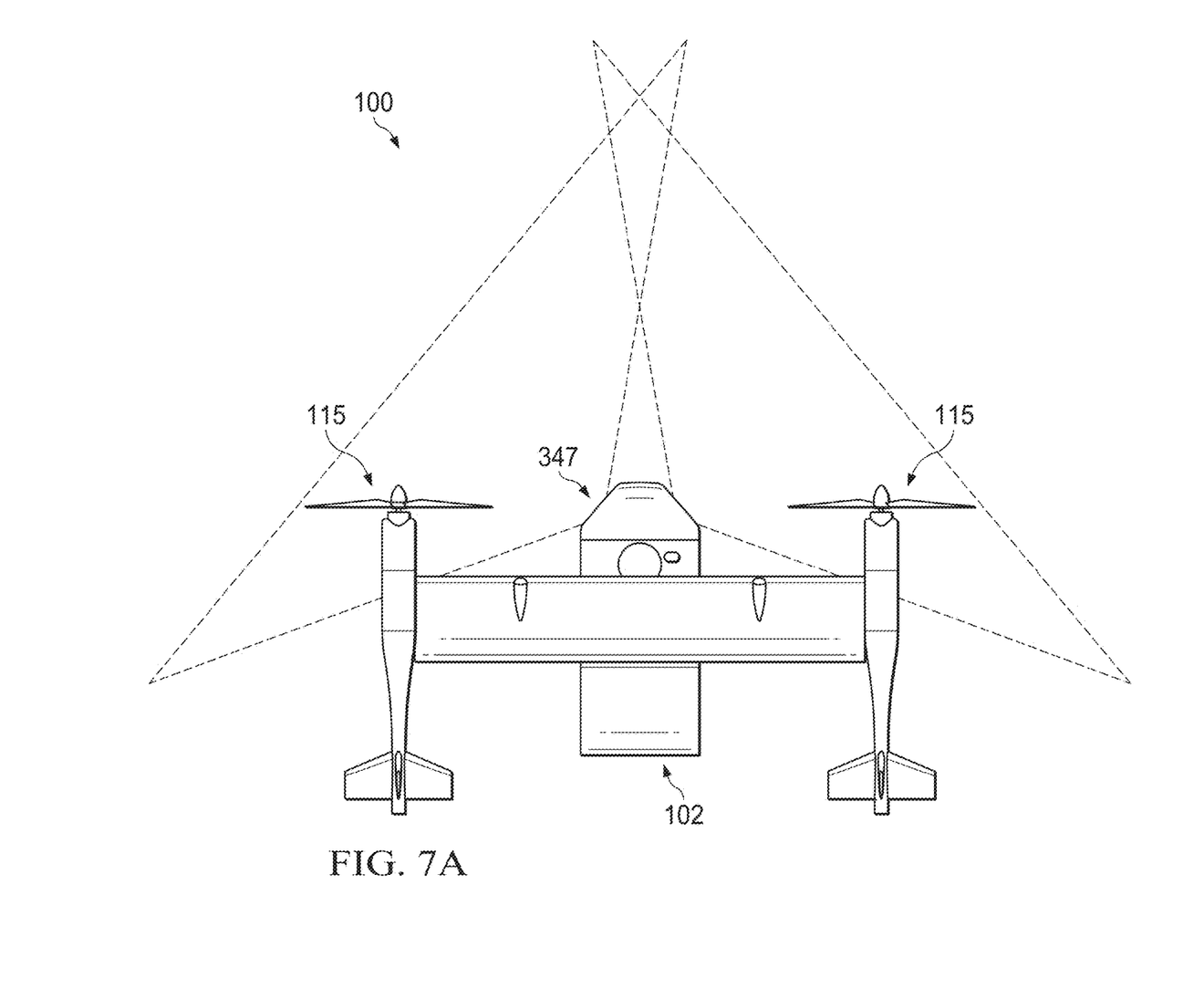
FIGS. 7A-B illustrate example operation of radars in a removable sensor assembly.
Figure 7B:
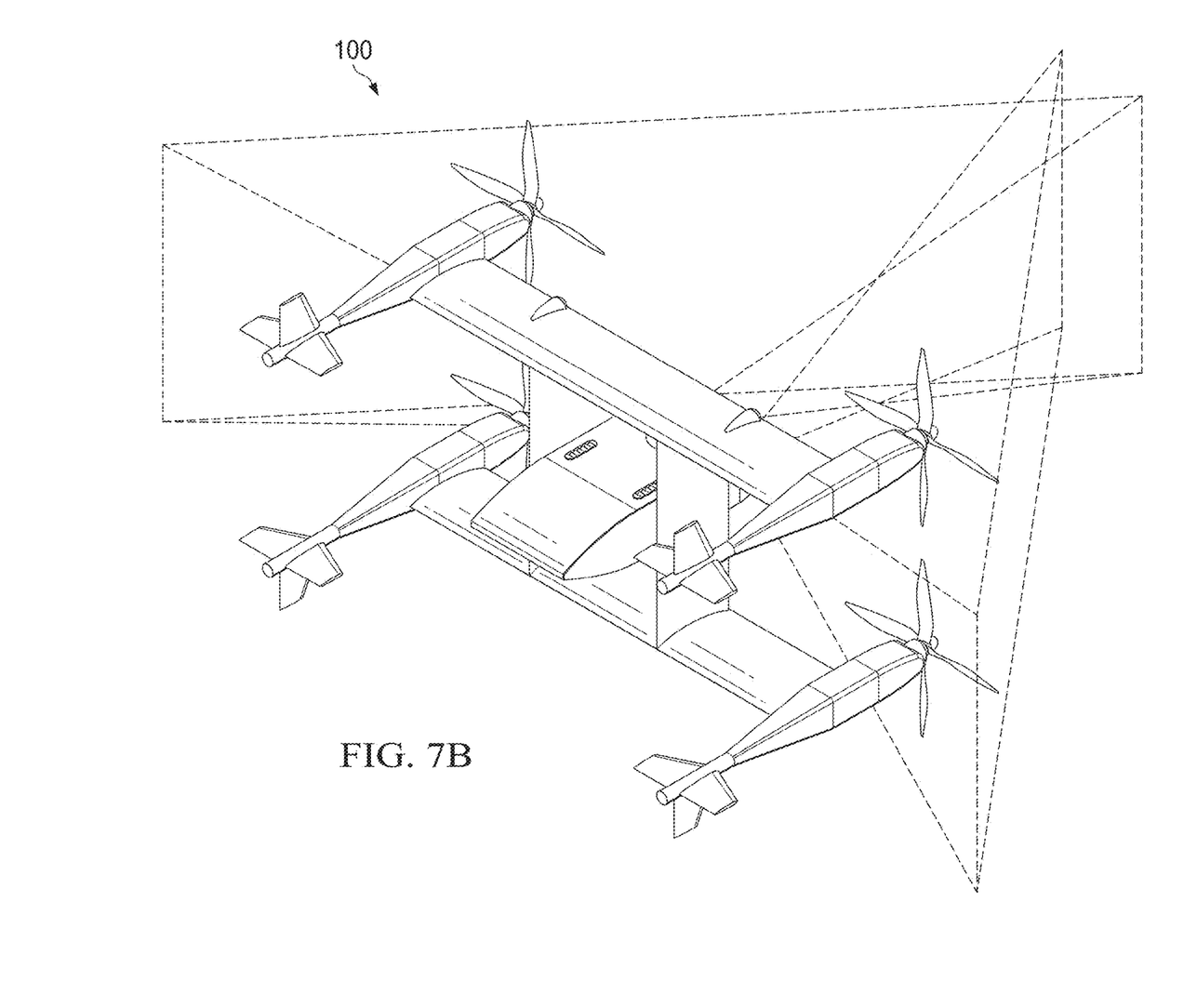

FIGS. 7A-B illustrate example operation of the radars 324 of the radar assemblies 441. FIG. 7A illustrates the nose portion 347 of the storage pod 102 extending forward of each propulsion assembly 115. In an example embodiment, the two radars 324 may each have a 120-degree field of regard in the horizontal plane and a 60-degree field of regard in the vertical plane. In various embodiments, the two radars 324 can provide a combined field of regard, for example, of 220 degrees by 60 degrees. It should be appreciated that both individual and combined fields of regard can be configurable to suit a given implementation. In a typical embodiment, the radars 324, via their location on the nose portion 347, are positioned forward of each propulsion assembly 115. Therefore, in a typical embodiment, the radars 324 do not observe any propulsion assembly 115 within their respective fields of regard.

Figure 8A:
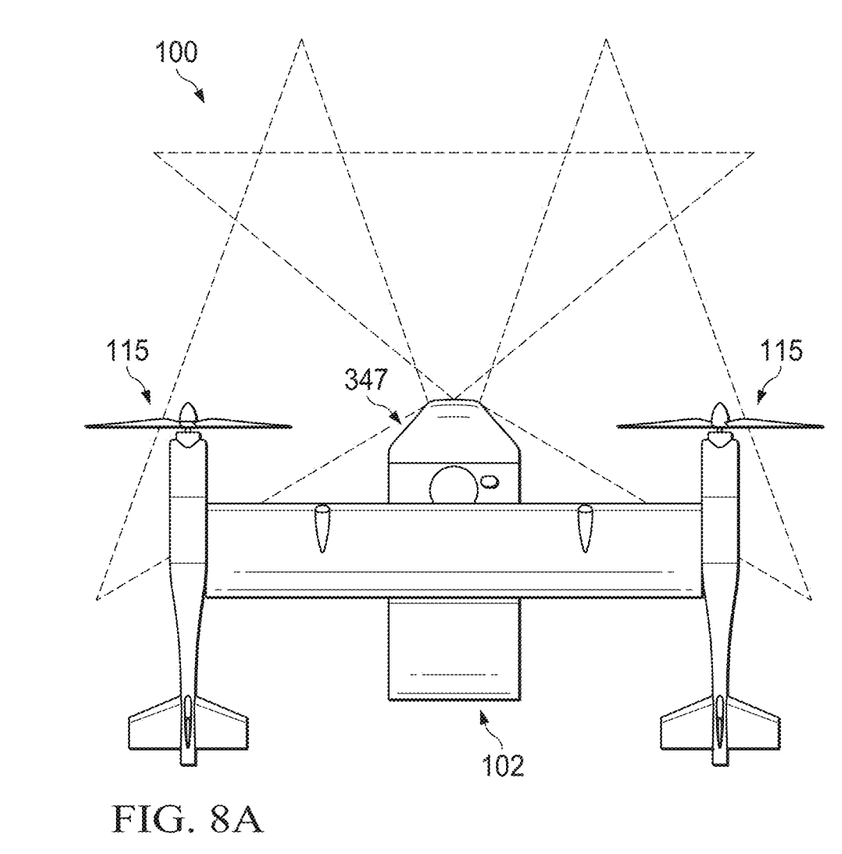
FIGS. 8A-B illustrate example operation of cameras in a removable sensor assembly.
Figure 8B:
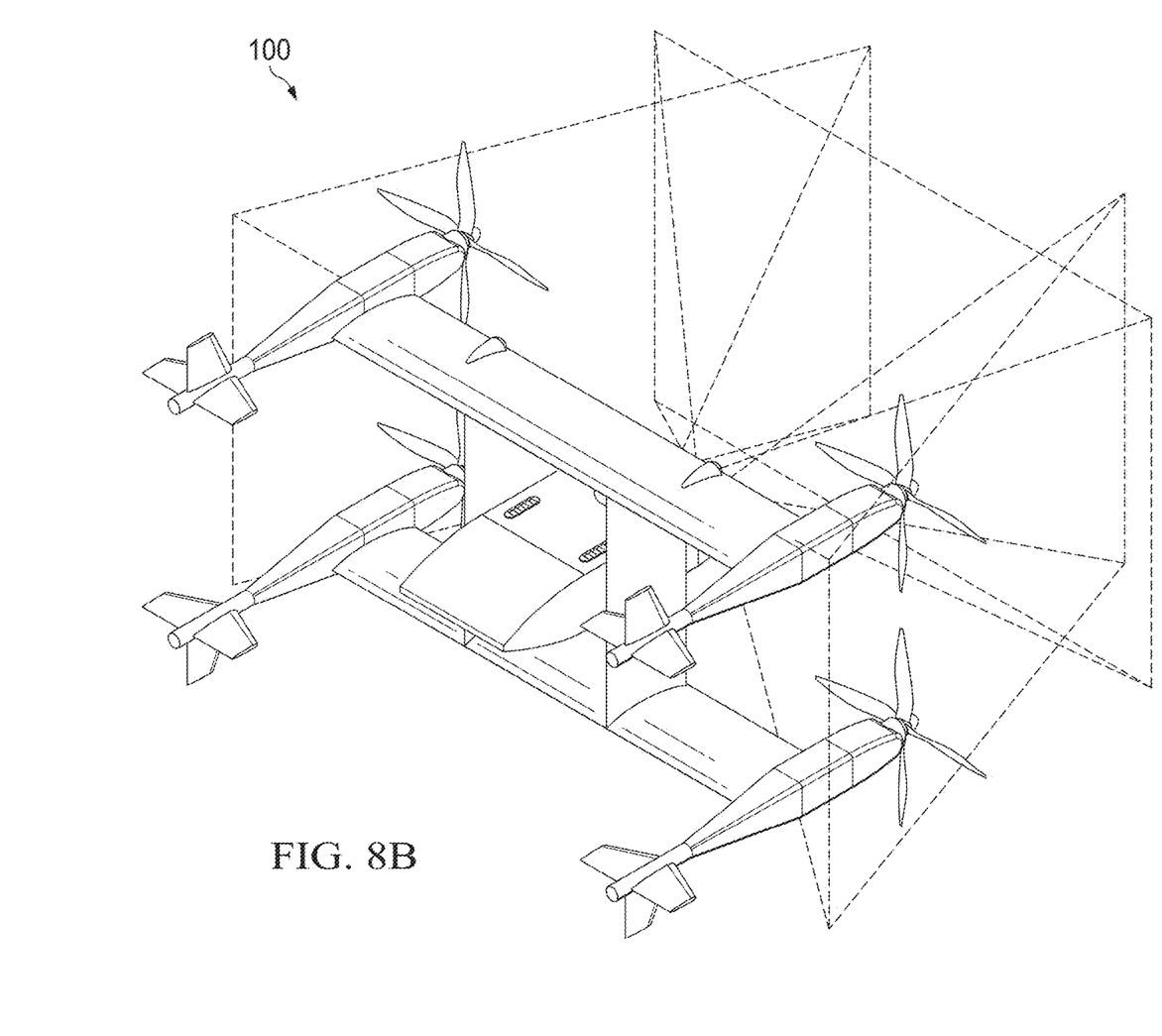

FIGS. 8A-B illustrate example operation of the cameras 326 of the removable camera assembly 440. In similar fashion to FIG. 7A, FIG. 8A illustrates the nose portion 347 of the storage pod 102 extending forward of each propulsion assembly 115. in an example embodiment, the three cameras 326 may each have an 80-degree field of view in the horizontal plane and a 60-degree field of view in the vertical plane. In various embodiments, the three cameras 326 can provide a combined field of view, for example, of 220 degrees by 60 degrees. It should be appreciated that both individual and combined fields of view can be configurable to suit a given implementation. In a typical embodiment, the cameras 326, via their location on the nose portion 347, are positioned forward of each propulsion assembly 115. Therefore, in a typical embodiment, the cameras 326 do not observe any propulsion assembly 115 within their respective fields of view.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft comprising:
   first and second wings;
   a plurality of propulsion assemblies, the plurality of propulsion assemblies comprising a propulsion assembly connected to each end of each of the first and second wings;
   first and second vertical supports disposed between the first and second wings; and
   a storage pod disposed between the first and second vertical supports, the storage pod comprising a nose portion that extends forward of the plurality of propulsion assemblies, the nose portion comprising at least one radar and at least one camera;
   wherein the nose portion comprises a removable sensor assembly that is detachable from the storage pod;
   wherein the removable sensor assembly comprises at least one removable camera assembly coupled thereto, the at least one removable camera assembly comprising the at least one camera;
   wherein the removable sensor assembly comprises at least one removable radar assembly coupled thereto, the at least one removable radar assembly comprising the at least one radar;
   wherein the removable sensor assembly is configured such that the at least one camera and the at least one radar are initially calibrated relative to each other;
   wherein the removable sensor assembly facilitates at least one of replacement and reuse of the removable sensor assembly with another similar storage pod without recalibration of the at least one camera to the at least one radar.

2. The aircraft of claim 1, wherein the at least one camera comprises a plurality of cameras configured to provide a combined field of view.

3. The aircraft of claim 2, wherein the at least one radar comprises a plurality of radars configured to provide a combined field of regard.

4. The aircraft of claim 1, wherein the storage pod comprises:
   a rear portion; and
   a storage compartment defined by a cavity between the nose portion and the rear portion.

5. The aircraft of claim 4, wherein:
   the nose portion comprises an air inlet; and
   the storage compartment comprises an air outlet thereof.

6. The aircraft of claim 4, wherein the storage pod comprises a control system communicably coupled to the at least one camera and the at least one radar.

7. The aircraft of claim 6, wherein the storage pod comprises:
   an automatic dependent surveillance-broadcast (ADS-B) receiver communicably coupled to the control system; and
   an antenna coupled to the ADS-B receiver.

8. The aircraft of claim 4, wherein the storage compartment comprises cargo.

9. The aircraft of claim 1, wherein the aircraft is a tail-sitter aircraft, the storage pod functioning as a fuselage of the aircraft.

* * * * *